Oct. 15, 1963 E. M. ROSCHKE 3,107,274

SUBSCRIPTION TELEVISION

Filed Dec. 31, 1954 7 Sheets-Sheet 1

ERWIN M. ROSCHKE
*INVENTOR.*

BY Francis W. Crotty

HIS ATTORNEY.

ERWIN M. ROSCHKE
*INVENTOR.*

BY Francis W. Crotty

HIS ATTORNEY.

ERWIN M. ROSCHKE
*INVENTOR.*

BY Francis W. Crotty

HIS ATTORNEY.

ERWIN M. ROSCHKE
*INVENTOR.*

BY Francis W. Crotty

HIS ATTORNEY.

ERWIN M. ROSCHKE
*INVENTOR.*

BY Francis W. Crotty

HIS ATTORNEY.

3,107,274
SUBSCRIPTION TELEVISION
Erwin M. Roschke, Des Plaines, Ill., assignor to Zenith Radio Corporation, a corporation of Delaware
Filed Dec. 31, 1954, Ser. No. 479,170
17 Claims. (Cl. 178—5.1)

This invention pertains to subscription television systems in which a television signal is transmitted in coded form to be utilized only in subscriber receivers equipped with decoding devices controlled in accordance with the code schedule employed at the transmitter.

The term "encoding" is used herein in its generic sense to encompass either coding at the transmitter or decoding at the receiver.

Numerous subscription television systems have been proposed in which a key or coding signal, which contains the code schedule information in scrambled or camouflaged form, is transmitted as a modulation component of the coded television signal itself or over an auxiliary air channel. The air-borne key or coding signal is subsequently unscrambled at the receiver in a manner known only to authorized subscribers and the unscrambled key signal is then used to actuate suitable encoding apparatus to decode the coded television signal. Scrambling and unscrambling of the key signal may be achieved, for example, by means of a plurality of code-determining elements, such as switches, which may be used to alter some characteristic of the signal or to channel different portions of the signal to different input circuits of the encoding apparatus. The particular adjustment of the code-determining elements required for intelligible reproduction of a given television program is, of course, conveyed only to authorized subscribers, and an appropriate charge may be levied in any desired manner. Systems of this general type are disclosed and claimed in copending application Serial No. 281,418, filed April 9, 1952, and issued July 15, 1958, as Patent 2,843,656 in the name of George V. Morris et al.; Serial No. 326,107, filed December 15, 1952, and issued Feb. 11, 1958, as Patent 2,823,252 in the name of Jack E. Bridges; Serial No. 366,727, filed July 8, 1953, and issued September 16, 1958, as Patent 2,852,598 in the name of Erwin M. Roschke; and Serial No. 370,174, filed July 24, 1953, and issued Oct. 27, 1959, as Patent 2,910,526, in the name of Walter S. Druz, all of which are assigned to the present assignee.

More particularly, in the system disclosed in the Druz application, for example, a combination of code signal bursts or pulses, individually having a predetermined identifying characteristic such as frequency, is transmitted to subscriber receivers during each field-retrace interval along with the composite video signal. These pulses, which are preferably randomly sequenced and randomly appearing within each combination, are derived from the composite television signal at the receiver and by means of suitable filters are segregated from one another for application over assigned input circuits to a transposition mechanism. The mechanism may employ a family of toggle switches to serve as code-determining elements for selectively establishing a multiplicity of circuit connections between the input circuits and a plurality of output circuits, which are connected in turn to various input circuits of a multi-stable control mechanism comprising a plurality of bi-stable multivibrators. With this arangement, the code signal pulses may be applied to the input circuits of the control mechanism in a prescribed sequence to operate this device from one to another of its stable operating conditions. Mode changes occur in the television system by varying the relative timing of the video and synchronizing components of the television signal, and the mode-changing schedule is determined by the manner in which the control mechanism is operated during each field-retrace interval.

The coding techniques of the described arangement, as well as those of the other aforementioned copending applications, are very effective and do permit the use of an air-borne code-conveying signal while preserving an adequate degree of secrecy. However, it may be desired to improve the secrecy aspects in order to decrease further, if not completely eliminate, any remote possibility of unauthorized pirating of the subscription telecast.

In the previous systems, the collective or overall pattern of the various code-determining elements employed at each receiver determines at least in part the operation of the decoding apparatus. If all of the elements are adjusted properly, decoding is achieved. On the other hand, if the code-determining elements are all incorrectly positioned, a completely scrambled and distorted picture results. However, it may be remotely possible in occasional and rare instances for an unauthorized person, not apprised of the required setting for a particular program, through the employment of a trial and error method of manipulating the code-determining elements to partially unscramble the picture as some of the code-determining elements are positioned to their respective correct settings. He may then concentrate his efforts on the elements not properly set up and as each one is correctly positioned, it may be possible to detect and guide the approach to the correct setting though the observation and evaluation of subtle visual clues in the form of progressive minor improvements in certain critical details of image reproduction. The present invention provides an arrangement for precluding or minimizing partial decoding even if some, but not all, of the code-determining elements are properly set up. In other words, if an unauthorized person bent on fraud attempts to reach the proper combination or pattern by trial and error methods, considerably fewer and even more subtle visual clues will be revealed on the receiver screen as the correct combination is approached, thus virtually eliminating any possibility of unauthorized appropriation of the coded telecast.

These enhanced secrecy aspects are achieved according to the present invention by deriving synchronous modifying signals from the encoding apparatus of the subscription transmitter and authorized subscirber receivers, which signals are used in turn to control further the operation of that apparatus. In such a system, if all of the code-determining elements of a subscriber receiver are not precisely adjusted to effect proper operation of the decoding apparatus, the modifying signal is incorect; this results in completely erroneous or non-synchronous operation of the decoding apparatus.

It is, accordingly, an object of the present invention to provide a new and improved subscription television system in which a television signal is coded with a high degree of complexity.

It is another object of the invention to provide an improved subscription television system employing an air-borne coding signal and wherein encoding is achieved in such a manner that unauthorized decoding is virtually eliminated.

It is an additional object of the invention to provide a novel method of translating a television signal.

In previous systems such as that disclosed in the aforementioned Druz application, the control mechanisms employed, which preferably take the form of one or more bi-stable multivibrators, may possibly be acuated by noise or other extraneous signals, resulting in non-synchronous operation between the transmitting and receiving equipment. This has been remedied in the past by translating reset pulses, occurring before each combination, directly to the bi-stable multivibrators to restore them to reference operating conditions or by including specific pulses within each code combination which are channeled through the transposition mechanism to certain input circuits of the multivibrators to have the same effect as the reset pulses, namely to trigger the multivibrators to the reference operating conditions. With the present invention, it has been found that specific reset pulses, either as part of the code combination or occuring at some other time, are not required. This represents a considerable improvement over prior systems since no longer is it necessary to provide either separate reset circuitry for the bi-stable multivibrators or to restrict or inhibit the selection or utilization of code combinations to those including predetermined reset pulses destined for triggering the control mechanism to reference operating conditions.

It is, therefore, a further object of the invention to provide a subscription television system in which all available code signal combinations may be employed at random without inhibition while maintaining stable synchronism between transmitter and authorized receiver operations.

A subscription television system, constructed in accordance with the present invention, comprises encoding apparatus for varying the operating mode of the system in accordance with a predetermined code schedule. A source of code signal components is provided and translating means, having a plurality of translating conditions, couples this source to the encoding apparatus. The system also has means coupled to the encoding apparatus and to the translating means for varying the translating condition of the translating means in accordance with the same predetermined code schedule.

The features of this invention which are believed to be new are set forth with particularity in the appended claims. The invention, together with further objects and advantages thereof, may best be understood, however, by reference to the following description in conjunction with the accompanying drawings, in which:

Figure 1:
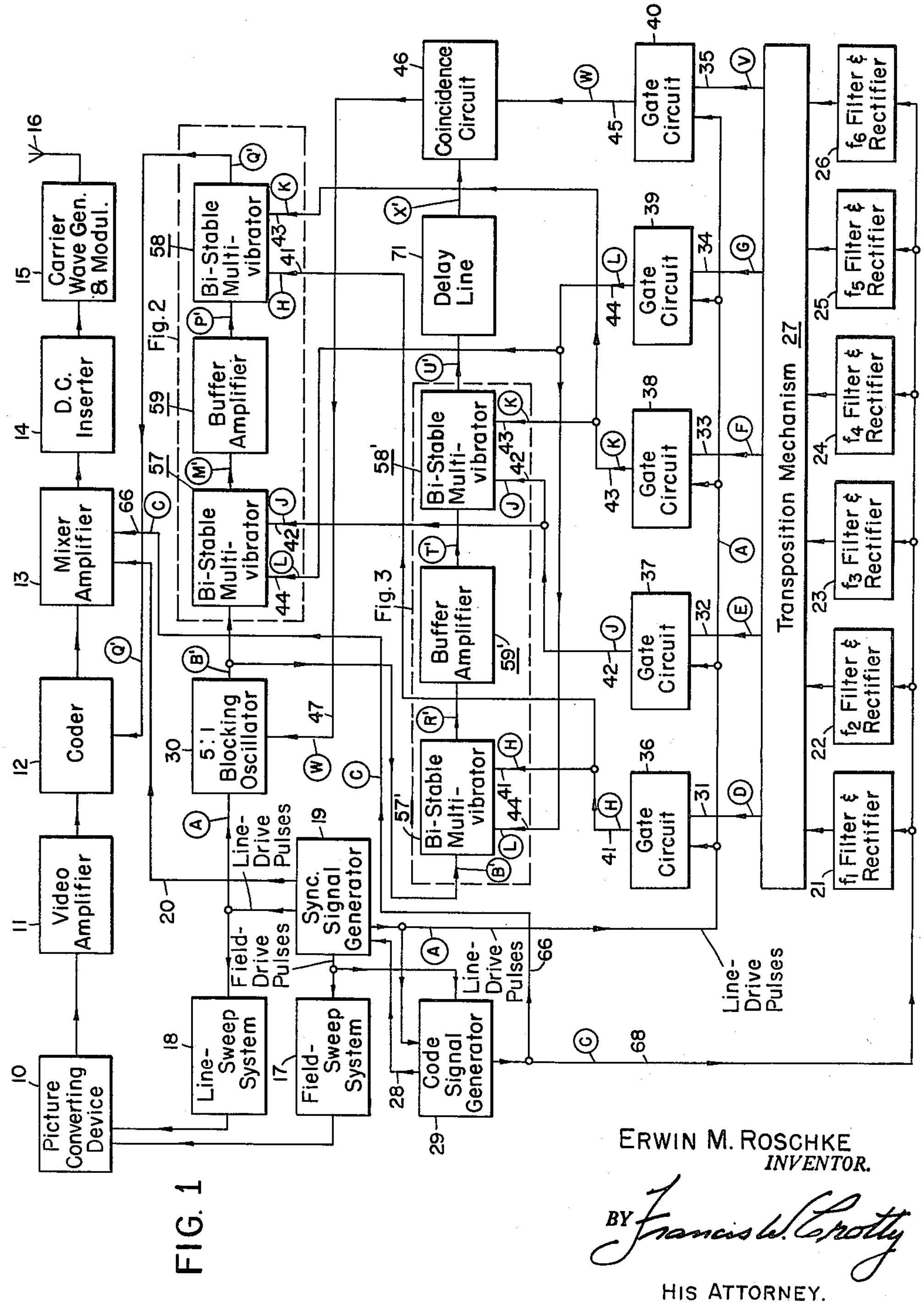
FIGURE 1 is a block diagram of a subscription television transmitter constructed in accordance with one embodiment of the invention.
Figure 4:
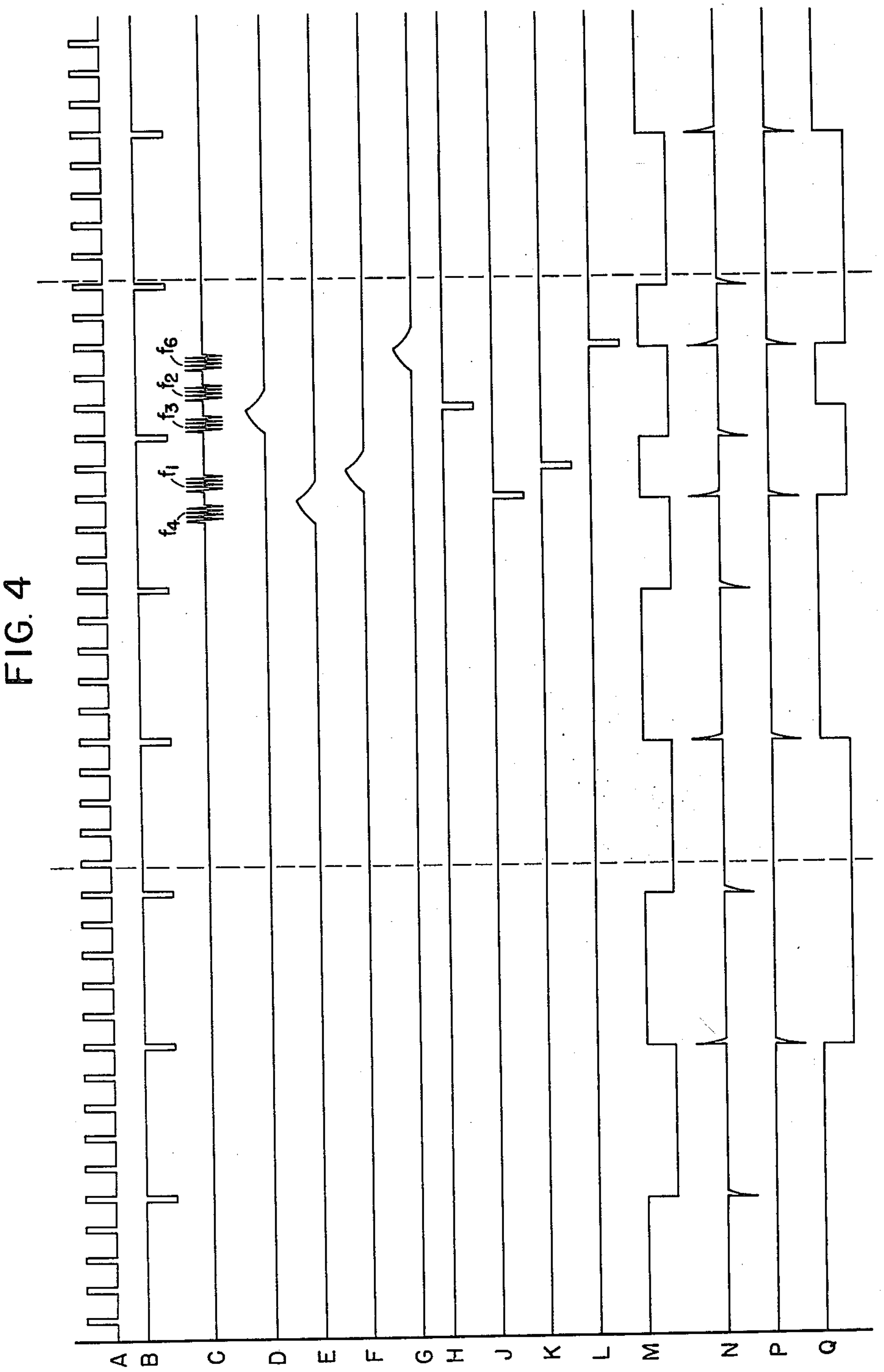
Figure 5:
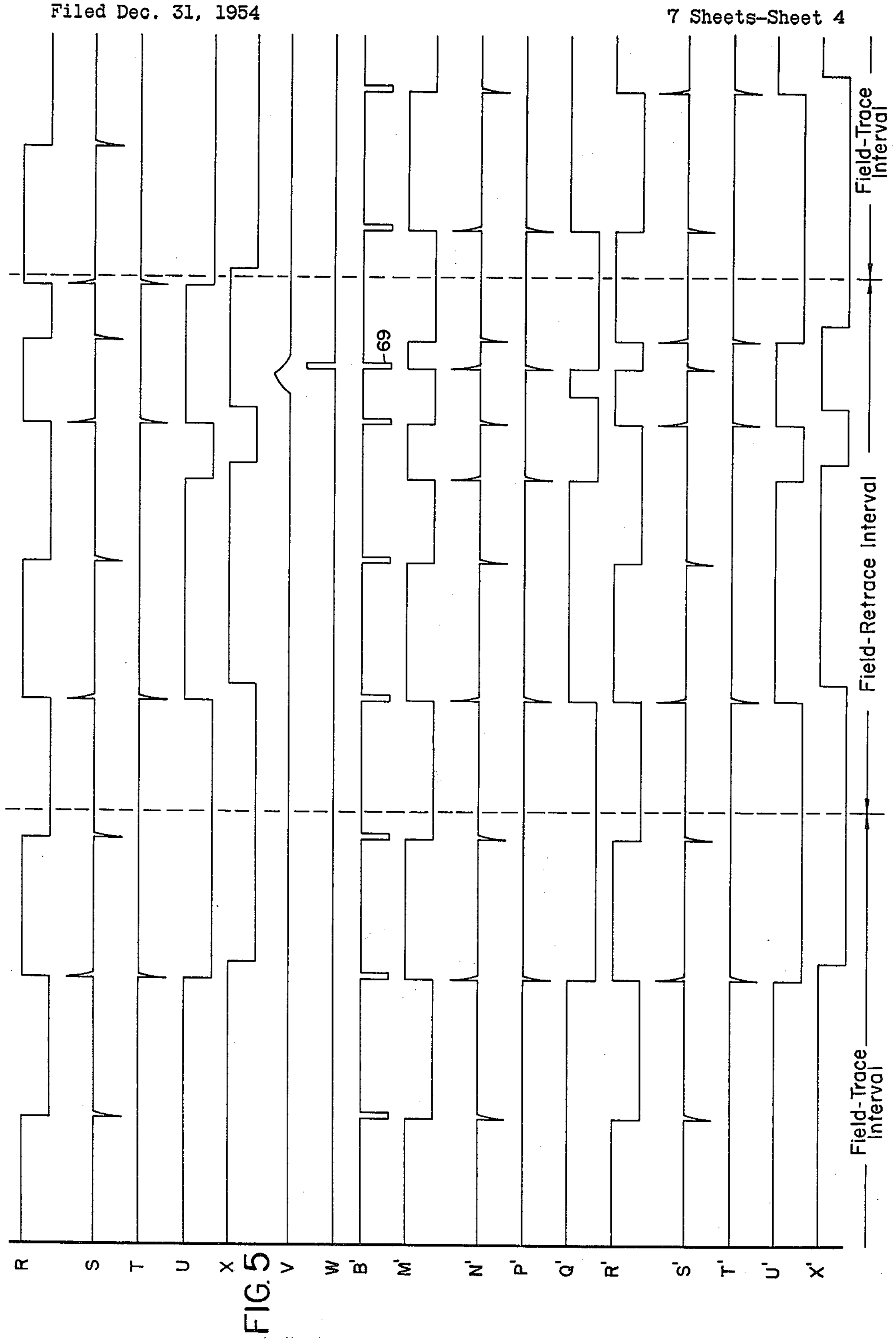
Figure 6:
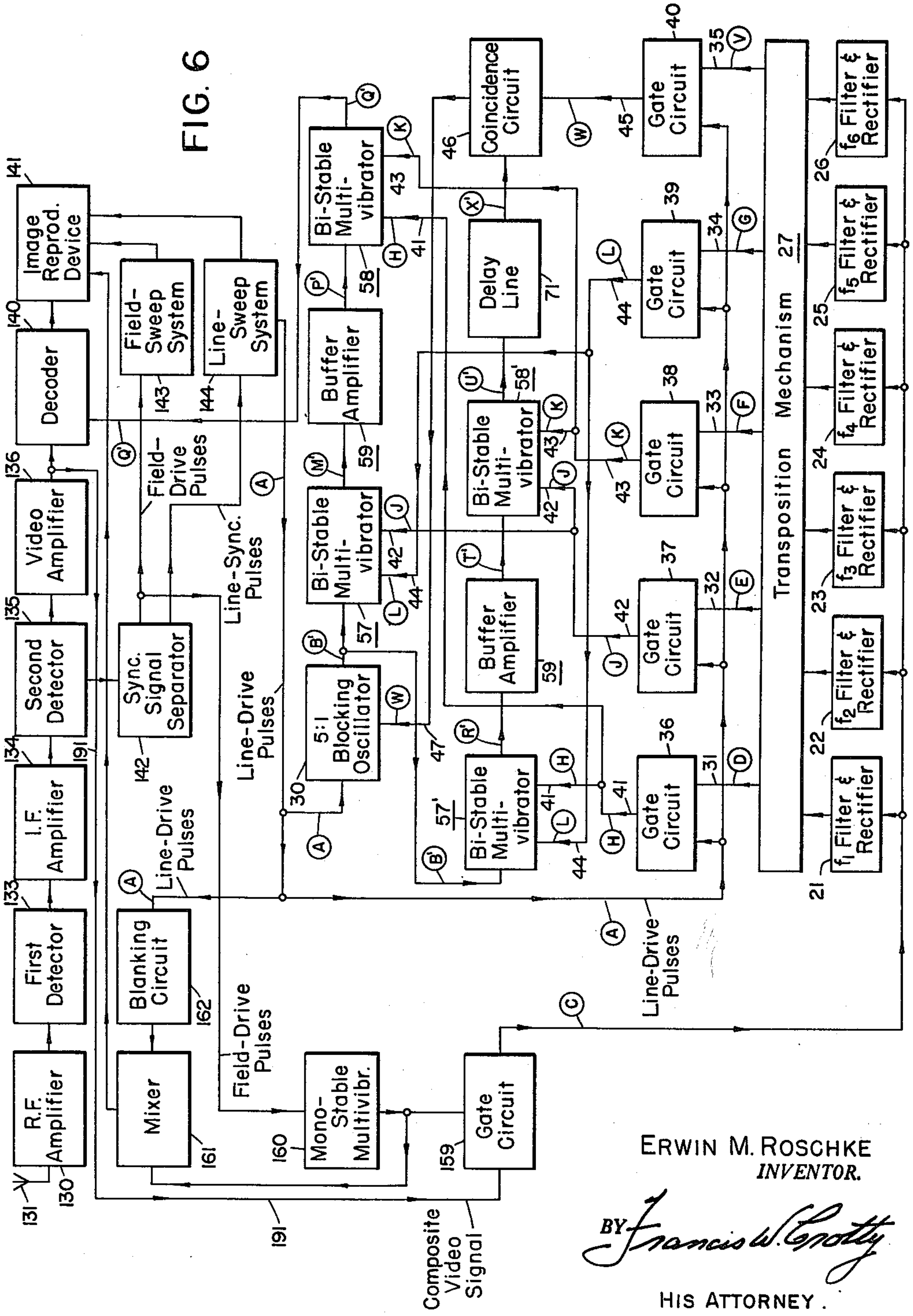
Figure 7:
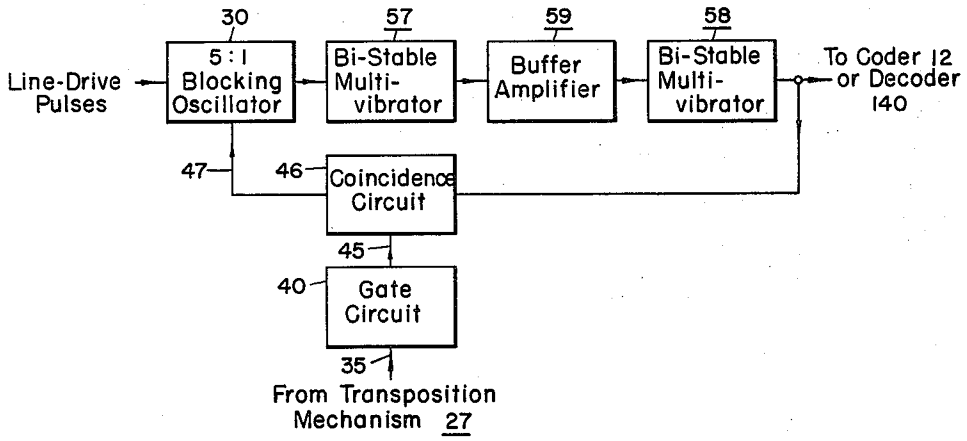
Figure 8:
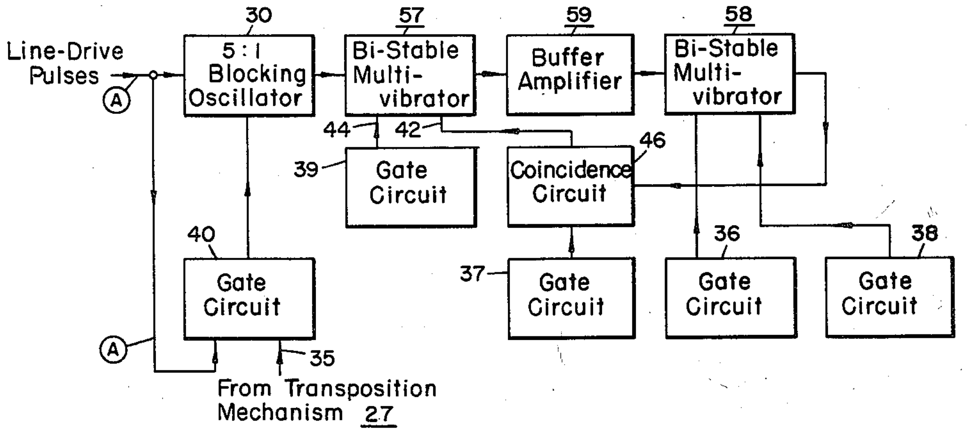
Figure 9:
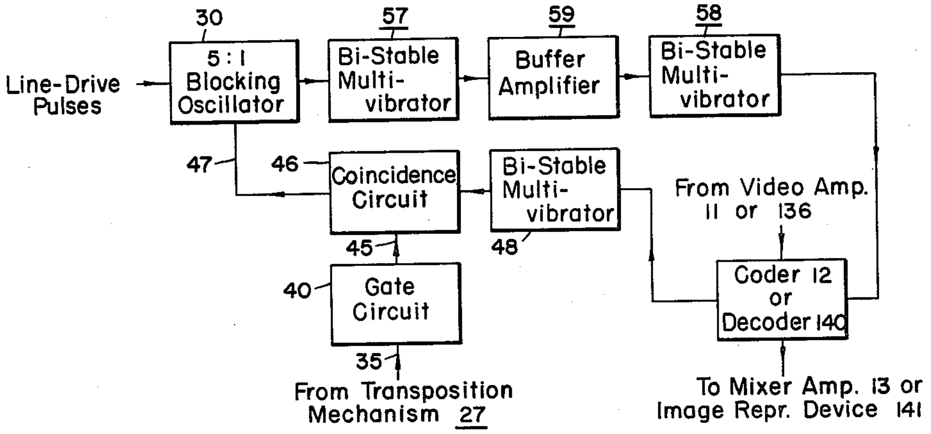
Figure 10:
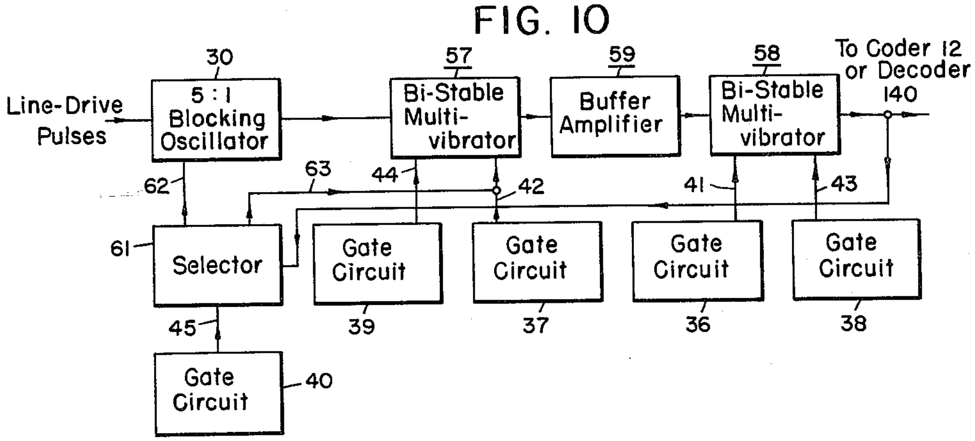

FIGURES 4 and 5 taken together with FIGURE 5 placed immediately below FIGURE 4 illustrate a family of curves useful in explaining the operation of the transmitter of FIGURE 1;

FIGURE 6 is a block diagram of a subscription television receiver constructed in accordance with the invention for operation in conjunction with the transmitter of FIGURE 1;

FIGURE 7 is a fragmentary block diagram of modified circuit connections for the transmitter of FIGURE 1 and the receiver of FIGURE 6, in accordance with another embodiment of the invention;

FIGURE 8 is a fragmentary block diagram of alternative circuit connections for the transmitter of FIGURE 1 and the receiver of FIGURE 6, in accordance with still another embodiment of the invention;

FIGURE 9 is a fragmentary block diagram of further alternative circuit connections for the transmitter of FIGURE 1 and the receiver of FIGURE 6, in accordance with a further embodiment of the invention; and FIGURE 10 is a fragmentary block diagram illustrating an additional embodiment of the invention.

The transmitter of FIGURE 1 includes a picture-converting device 10 which may be an iconoscope, image orthicon or other known device for developing a video signal representing the image to be televised. The output terminals of device 10 are connected through a video amplifier 11 and an encoding device or coder 12 to the input terminals of a mixer amplifier 13. Coder 12 may be similar to that disclosed and claimed in copending application Serial No. 243,039, filed August 22, 1951, and issued August 7, 1956, as Patent 2,758,153, in the name of Robert Adler and assigned to the present assignee. It may comprise a beam-deflection tube having a pair of output circuits which may be selectively coupled into the video channel as the electron beam thereof is deflected from one to another of two segmental anodes coupled to such output circuits. One of these circuits includes a time-delay network so that the timing of the video components relative to the synchronizing components of the radiated television signal varies as the beam of the deflection tube is switched between its anodes. This switching effect is accomplished by a beam-deflection control or actuating signal applied to encoding device 12, as explained hereinafter. Such intermittent variations in the relative timing of the video and synchronizing components effectively codes the television signal since conventional television receivers, not equipped with suitable decoding apparatus, require a constant or invariable time relation between the video and synchronizing components to provide intelligible image reproduction.

More specifically, coder 12 has at least two stable operating conditions each of which imposes a different operating mode on the transmitter. In the first operating condition, coder 12 extends the video channel from amplifier 11 to mixer 13 without introducing any appreciable time delay, and in this condition the transmitter operation is conventional particularly in respect of the time relation between the video and synchronizing components of the radiated signal. In its second operating condition, the encoding device introduces a time delay in the video channel, and the transmitter then functions in an abnormal mode since the video and synchronizing components of the radiated signal have an abnormal time relation with respect to one another.

Mixer 13 is connected through a direct-current inserter 14 to a carrier-wave generator and modulator 15 which, in turn, is connected to an antenna 16. The transmitter also includes a synchronizing-signal generator 19 which supplies field- and line-synchronizing components and associated pedestal components to mixer amplifier 13 through suitable circuit connections here schematically represented as a single conductor 20. Generator 19 further supplies field- and line-drive pulses to a field-sweep system 17 and to a line-sweep system 18, respectively. The output terminals of sweep systems 17 and 18 are connected to the field- and line-deflection elements (not shown) associated with picture-converting device 10.

Synchronizing-signal generator 19 additionally supplies line-drive pulses to a conventional stepdown blocking oscillator 30 which has its output terminals connected to the input terminals of a conventional bi-stable multivibrator 57, such that the multivibrator is triggered from one to the other of its two stable operating conditions in response to successive applied pulses. For illustrative purposes, a stepdown count of 5:1 is assumed for blocking oscillator 30, although other counting ratios may be employed. Multivibrator 57 is coupled through a buffer amplifier 59 to the input terminals of another bi-stable multivibrator 58 which has its output terminals connected to coder 12. As explained in detail hereinafter in connection with FIGURE 2, multivibrators 57 and 58 constitute elements of a control mechanism which operates in response to applied pulses from blocking oscillator 30 to effect actuation of encoding device 12 between its operating conditions to encode the television signal in accordance with a predetermined code schedule.

Generator 19 also supplies field-drive pulses to one input circuit of a code signal generator 29 and line-drive pulses to another input circuit of the generator. Unit 29 has one output circuit connected to synchronizing-signal generator 19 over conductor 28 and another output circuit connected over conductor 66 to an input circuit of mixer amplifier 13 and over conductor 68 to the input circuits of a series of filter-rectifier units 21—26. Code signal generator 29 is provided to develop during each field-retrace interval a combination of code signal components or bursts individually having a predetermined identifying characteristic such as frequency and collectively determining a code schedule in accordance with their appearance and order within the combination. A suitable code signal generator is fully disclosed and claimed in copending application Serial No. 463,702, filed October 21, 1954, and issued August 2, 1960, as Patent 2,947,804, in the name of Carl G. Eilers et al. and assigned to the present assignee, and thus generator 29 is shown only in block diagram to avoid unduly encumbering the description and drawing. Certain other features described in the present application, in addition to the code signal generator, are also disclosed and claimed in the above-mentioned Eilers et al. application.

In the illustrated embodiment, and as is described in detail in copending application Serial No. 463,702, Eilers et al., the code signal generated during each field-retrace interval may comprise a series of five or six bursts of any of six various signal frequencies $f_1$–$f_6$, inclusive, preferably randomly sequenced and randomly appearing within the interval, and these bursts are individually produced between successive line-drive pulses superimposed on the vertical blanking pedestal. Each of filter-rectifier units 21–26 is selective to one of the different signal-burst frequencies $f_1$–$f_6$ to facilitate separation of the components from one another for selective application to a series of input circuits of a transposition mechanism 27. This mechanism, which is adjusted in accordance with a predetermined switch setting pattern, is provided for the purpose of selectively connecting any one of the six filter-rectifier units 21–26 to any one of five output circuits or conductors 31–35 and may comprise a family of toggle switches as shown in the aforementioned Bridges application Serial No. 326,107, or a wafer switch or printed circuit arrangement as disclosed in copending application Serial No. 407,192, Morris, filed February 1, 1954, and issued December 30, 1958, as Patent 2,866,961.

Conductors 31–35 are connected to respective normally-closed gate circuits 36–40 which are also supplied with line-drive pulses from synchronizing-signal generator 19. The output circuits of gates 36 and 38 are connected over conductors 41 and 43 respectively to bi-stable multivibrator 58, and the output circuits of gates 37 and 39 are connected over conductors 42 and 44 respectively to bi-stable multivibrator 57.

In this embodiment of the invention, 5:1 blocking oscillator 30 is also connected to another series or set of cascade-coupled bi-stable multivibrators. Specifically, a bi-stable multivibrator 57′ is also connected to blocking oscillator 30, and the output of this multivibrator is connected through a buffer amplifier 59′ to another bi-stable multivibrator 58′. The output circuit of multivibrator 58′ is connected through a delay line 71 to one input circuit of a non-linear signal translating device or coincidence circuit 46 which has another input circuit connected to gate circuit 40 over conductor 45. The output circuit of coincidence stage 46 is connected to an input circuit of blocking oscillator 30 over conductor 47 for reset purposes, that is, to establish oscillator 30 in a reference operating condition each time a pulse appears in the output circuit of coincidence stage 46. As in the case of multivibrators 57 and 58, multivibrators 57′ and 58′ are also controlled by pulses from code signal generator 29 which are translated to gates 36–39 through transposition mechanism 27. Specifically, the output circuits of gates 36 and 39 are connected over conductors 41 and 44 respectively to bi-stable multivibrator 57′, and the output circuits of gates 37 and 38 are connected over conductors 42 and 43 respectively to bi-stable multivibrator 58′.

Figure 2:
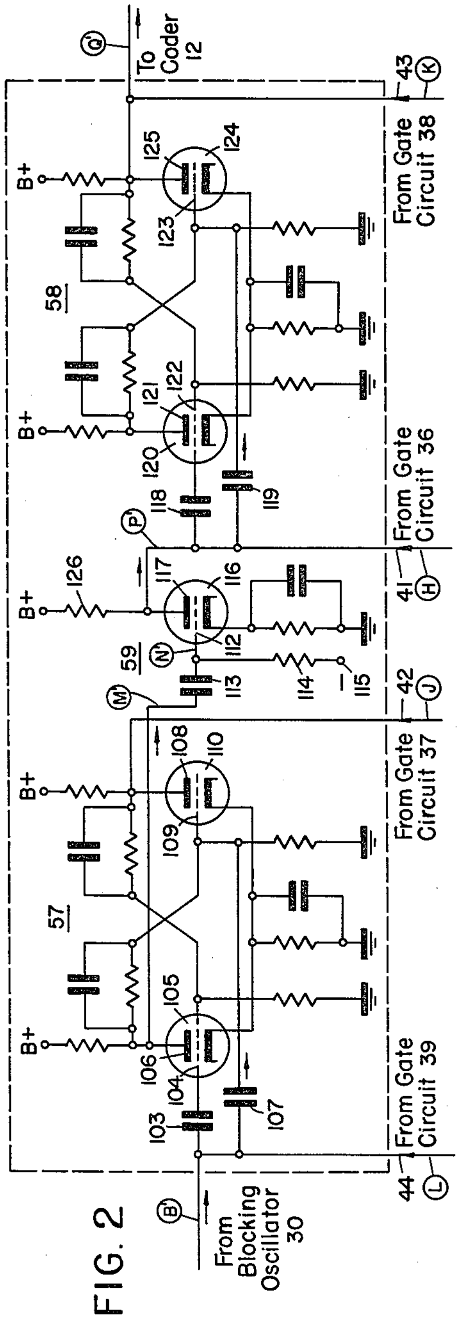
FIGURE 2 is a detailed schematic circuit diagram of a portion of the transmitter illustrated in FIGURE 1.

Reference is now made to the construction of multivibrators 57 and 58 and buffer amplifier 59 shown in detail in FIGURE 2. These multivibrators considered collectively as a unit have a sequence of operating steps and are actuated through this sequence by means of the periodically recurring pulses which are derived from blocking oscillator 30 and applied through a condenser 103 to the control electrode 104 of an electron-discharge device 105 and through a condenser 107 to the control electrode 109 of an electron-discharge device 110, devices 105 and 110 being cross-coupled to form the conventional bi-stable multivibrator circuit 57. The control electrode 112 of buffer amplifier tube 116 is coupled to anode 106 of device 105 through a condenser 113, control electrode 112 also being connected to a source of negative bias potential 115 through a resistor 114 which in combination with condenser 113 forms a differentiating circuit. The anode 117 of discharge device 116 is coupled to B+ through a load resistor 126 and through condensers 118 and 119 to the control electrodes 122 and 123 of a pair of electron-discharge devices 120 and 124 respectively, these devices and their associated circuit elements constituting the conventional bi-stable multivibrator 58. Output conductor 44 from gate circuit 39 is coupled to control electrodes 104 and 109 through condensers 103 and 107, respectively, output conductor 42 from gate circuit 37 is connected to anode 108 of device 110, output conductor 41 from gate circuit 36 is coupled to control electrodes 122 and 123 through condensers 118 and 119 respectively, and output conductor 43 from gate circuit 38 is connected to anode 125 of device 124.

Figure 3:
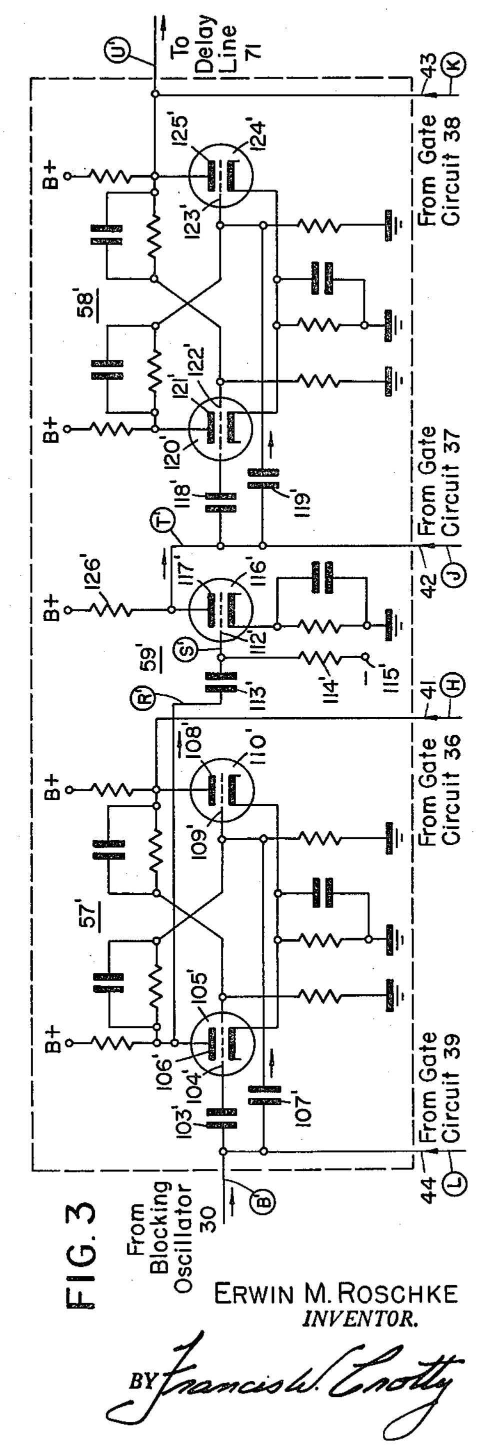
FIGURE 3 is a detailed schematic circuit diagram of another portion of the transmitter illustrated in FIGURE 1.

Reference is now made to FIGURE 3 which illustrates in detail multivibrators 57′ and 58′ and buffer amplifier 59′, from which it may be observed that, with the exception of the connections from gate circuits 36—39, the circuitry is identical to that illustrated in FIGURE 2, as indicated by the corresponding primed reference numerals. The input connections from the gate circuits are, however, different in order that the control signal developed in the output circuit of multivibrator 58′ may be distinctly different than that produced in the output circuit of multivibrator 58. Specifically, output conductor 44 from gate circuit 39 is coupled to control electrodes 104′ and 109′ through condensers 103′ and 107′ respectively, output conductor 41 from gate circuit 36 is connected to anode 108′ of device 110′, output conductor 42 from gate circuit 37 is coupled to control electrodes 122′ and 123′ through condensers 118′ and 119′ respectively, and output conductor 43 from gate circuit 38 is connected to anode 125′ of device 124′.

In short, multivibrators 57 and 58 in conjunction with blocking oscillator 30 constitute a first control or actuating means for developing a first control signal having an amplitude characteristic that varies between at least two predetermined values in accordance with a predetermined first secret code schedule which is determined in part by the distribution of the code signal bursts and in part by the switch setting pattern of transposition mechanism 27. This first control signal represents secret code information and is translated to encoding device 12 to effect actuation thereof between its operating conditions in accordance with the first code schedule. Multivibrators 57′ and 58′ and delay line 71 in cooperation with blocking oscillator 30 constitute a second control means for developing a second control signal having an amplitude characteristic that varies between at least two predetermined values in accordance with a predetermined second code or control schedule distinctly different than the first code schedule and also determined by the distribution of the code signal bursts and the transposition mechanism adjustment. The output circuit of gate 40 may be considered a source of code signal components which are applied to coincidence circuit 46. The second control signal, which represents control information, serves as a gating signal for coincidence circuit 46 in order to effect application of only certain ones of the code signal components to blocking oscillator 30 which occur during time intervals when the amplitude characteristic of the second control signal is established at a predetermined amplitude level.

In order to simplify the detailed explanation of the invention, the operation of the described transmitter will initially be considered without regard to the technique of coding. Picture-converting device 10 produces video-frequency components representing the picture information to be televised and these components, after amplification in video amplifier 11, are supplied through coder 12 to mixer amplifier 13. The mixer also receives the usual line- and field-synchronizing and blanking pulses over conductor 20 from synchronizing-signal generator 19. The composite video signal developed by mixer amplifier 13 is adjusted as to proper background level in direct current inserter 14 and is amplitude-modulated on the picture carrier wave in unit 15 to develop a composite television signal. The modulated video carrier wave is supplied to antenna 16 for transmission to subscriber receivers. It will, of course, be understood that in the generation of the video-frequency components, sweep systems 17 and 18 are synchronized by the field- and line-drive pulses from generator 19. As in any television broadcast, the accompanying audio information is modulated on a sound carrier and concurrently radiated; the sound system may be entirely conventional or may include suitable sound coding apparatus.

Briefly, coding of the video portion of the broadcast is accomplished by coder 12 under the influence of a control signal developed by multivibrator 58 which switches the beam of the beam-deflection tube back and forth between its two segmental anodes in accordance with a secret code schedule represented by amplitude variations of the control signal. As previously explained, this actuation of the encoding device varies the operating mode of the transmitter by modifying the time relation between the video and synchronizing components of the radiated signal and thus achieves effective picture scrambling or coding.

In order to develop a deflection-control signal for coder 12, and disregarding for the moment the specific function and effect of the code signal bursts produced in generator 29, line-drive pulses are applied to conventional 5:1 blocking oscillator 30 wherein they are effectively frequency-divided on a 5:1 basis to supply every fifth line-drive pulse to bi-stable multivibrator 57. This multivibrator functions in a conventional manner and is triggered between its operating conditions in response to successive applied pulses from oscillator 30 to supply a periodic square-wave signal to buffer amplifier 59. The square-wave signal from multivibrator 57 is differentiated to provide pulses of alternating positive and negative polarity to buffer amplifier 59. Buffer amplifier 59 is biased beyond cutoff, because of the connection of its control grid 112 to negative bias source 115, to reject or suppress the negative-polarity differentiated pulses and supplies pulses in response to positive excursions of the signal from multivibrator 57 to the common input of bi-stable multivibrator 58 which also operates in conventional manner to produce a square-wave control signal for application to coder 12, with the amplitude excursions of the control signal corresponding to successive applied pulses from buffer amplifier 59.

In the interests of simplifying the detailed explanation of the operation of the transmitter with regard to the manner in which the cyclic operation of multivibrators 57 and 58 is interrupted or altered at times under the control of code signal generator 29 and transposition mechanism 27, idealized signal waveforms appearing at various portions of the transmitter indicated by encircled reference letters are given corresponding letter designations in the graphical representations of FIGURES 4 and 5. For the present, the effect of the second series of multivibrators 57' and 58', delay line 71 and coincidence circuit 46 will be neglected; consequently, the priming of the letter designations on the circuit diagrams should be disregarded. Curve A illustrates positive-polarity line-drive pulses which are supplied from generator 19 to 5:1 blocking oscillator 30 wherein they are divided to produce a pulse of the opposite polarity at the output terminals of the oscillator for every five line-drive pulses supplied thereto, as shown in curve B. The output signal from blocking oscillator 30 is continuously applied to control electrodes 104 and 109 of multivibrator 57 throughout each field-retrace interval as well as each field-trace interval, whereas only during each field-retrace interval are pulses applied to multivibrators 57 and 58 via conductors 41—44.

During any one particular field-retrace interval, code signal generator 29 may develop a series of code signal bursts as shown in curve C. It will be noted that the various bursts shown in curve C are so grouped or distributed in point of time that there is a "gap" or time interval between the second and third bursts in order that a code signal pulse does not occur in substantial time coincidence with a periodically recurring pulse from blocking oscillator 30 (curve B). Circuitry for insuring such distribution of the code signal bursts to prevent any conflict that may result from the simultaneous application of pulses from the blocking oscillator and pulses from generator 29 to multivibrator 57, as will be made apparent hereinafter, is specifically disclosed in the aforementioned Roschke application Serial No. 463,702.

Pulses are applied to multivibrator 58 through buffer amplifier 59 as well as from generator 29 through selected ones of the filter-rectifiers 21—26 but they do not conflict with one another. Each pulse from multivibrator 57 is initiated by a pulse from blocking oscillator 30 or by a pulse from generator 29 and those pulses from generator 29 that trigger multivibrator 57 are not supplied to multivibrator 58. Consequently, the pulses delivered to multivibrator 58 from generator 29 occur at times other than the occurrence of the pulses received from multivibrator 57 and there can be no conflict. Of course, some of the bursts from generator 29 may effect application of pulses to respective input circuits of both multivibrators 57 and 58; if that is done, suitable circuitry may be included as a precaution to avoid any conflict in the operation of the system. For example, if the same burst results in the application of pulses to both of the multivibrators, a delay line may be interposed in the input circuit of one of them to avoid undesirable ambiguity.

The particular code signal combination of waveform C contains no more than one burst of any given frequency; in actual operation, there may be instances of repeating burst frequencies within the code signal combinations developed during some or all of the field-retrace intervals.

The code signal bursts of curve C are separated from one another and rectified in circuits 21—26 for individual application to the various input circuits of transposition mechanism 27. This mechanism may establish any of a multitude of circuit connections between its input circuits and output conductors 31—35 so that the rectified pulses are supplied to normally-closed gate circuits 36—40 in accordance with a coding schedule dependent on the setting of the transposition mechanism. For purposes of illustration, it may be assumed that mechanism 27 is so adjusted that $f_3$ filter-rectifier 23 is connected to conductor 31 to supply the rectified $f_3$ burst of curve D to gate circuit 36, that $f_4$ filter-rectifier 24 is connected to conductor 32 to supply the rectified $f_4$ burst of curve E to gate circuit 37, that $f_1$ filter-rectifier 21 is connected to conductor 33 to supply the rectified burst shown in curve F to gate circuit 38, and that $f_6$ filter-rectifier 26 is connected to conductor 34 to apply the rectified pulse of curve G to gate circuit 39. It may also be assumed that $f_2$ filter-rectifier unit 22 is connected through mechanism 27 to conductor 35 to supply the rectified $f_2$ burst to gate circuit 40, but since the effect of coincidence circuit 46 will be disregarded for the moment the $f_2$ burst will be neglected. Filter-rectifier 25 may also, of course, be connected to any selected one of output conductors 31—35 through the transposition mechanism, but inasmuch as no $f_5$ burst occurs in the assumed code signal combination, this unit takes no active part in interpreting and employing the illustration signal combination.

Normally-closed gate circuits 36—39 also receive line-drive pulses (wave form A) from generator 19, and the signals of curves D, E, F and G gate in those of the line-drive pulses that occur in time coincidence with the respective gating pulses. Consequently, the signal of curve H is supplied over conductor 41 to control electrodes 122 and 123 of multivibrator 58, the signal of curve J is applied over conductor 42 to control electrode 104 of multivibrator 57 via the cross-coupling network from anode 108, the signal of curve K is applied over conductor 43 to control electrode 122 of multivibrator 58 via the cross-coupling network from anode 125, and the signal of curve L is supplied over conductor 44 to control electrodes 104 and 109 of multivibrator 57.

Thus, the pulses of curves B, L and J are applied to multivibrator 57. For convenience, this multivibrator is assumed to be initially in its first stable operating condition wherein discharge device 105 is non-conductive and device 110 is conductive, as indicated by wave form M which appears at anode 106, although the initial operating condition is immaterial since each pulse of wave form B is applied to the control electrodes of both tubes 105 and 110 and thus is effective to cut off the conducting tube, whichever one that may be. On application of the first pulse of curve B from blocking oscillator 30, discharge device 110 is therefore made non-conductive and by means of well-known multivibrator action device 105 becomes conductive. Similarly, in response to the second pulse of curve B, multivibrator 57 is again triggered inasmuch as the negative pulse is applied to control electrode 104 to cause device 105 to become non-conductive and device 110 conductive. Thus, by virtue of the fact that the negative pulses of curve B are always applied to the control electrodes of both tubes of multivibrator 57, this circuit is triggered between its operating conditions by successive B pulses to produce the periodic square wave shown in the initial portion of curve M prior to the occurrence of the first signal burst of curve C.

In response to the $f_4$ burst of curve C, the pulse of curve J is applied to control electrode 104 of device 105 over the cross-coupling circuit from anode 108, and since that device is then in its conductive state (as shown by curve M), the applied negative pulse is effective to cut-off device 105 and render device 110 conductive. The pulse of curve B from blocking oscillator 30 which occurs immediately subsequent to the $f_1$ burst of curve C is the next pulse applied to multivibrator 57 and is effective to trigger it to the condition wherein device 105 is conductive and device 110 non-conductive. It should now be apparent that no signal burst has been included in the combination of curve C between the $f_1$ and $f_3$ bursts in order to avoid the possibility of simultaneous application of a pulse from the blocking oscillator and a pulse over conductor 44 or 42 which might otherwise result in conflicting or opposing effects and lead to ambiguity or instability in the coding operation.

The next pulse supplied to multivibrator 57 is initiated by the $f_6$ burst which results in the application of the pulse of curve L to both control electrodes 104 and 109 to trip multivibrator 57 to its other condition, as shown by curve M. The last two amplitude excursions shown in waveform M result from the application of the last two pulses of curve B from the blocking oscillator and reflect a resumption of the periodic actuation of multivibrator 57 following the termination of the mode-determining interval, that is, the interval in which bursts of code signal components occur.

The signal developed at anode 106, namely curve M, is applied to the differentiating circuit 113, 114 to produce the signal of curve N. This latter is impressed on control electrode 112 of buffer amplifier 116 which is normally biased beyond cut-off by means of source 115; thus, only the positive-polarity differentiated pulses of curve N are translated through the buffer stage, accompanied by a normal 180° phase inversion. The signal of curve P therefore appears at anode 117 of device 116 and is impressed on control electrodes 122 and 123 of multivibrator 58 through condensers 118 and 119 respectively to trigger that multivibrator between its two operating conditions in the same manner as explained with respect to multivibrator 57. During the field-trace intervals, the pulses of waveform P correspond to alternate pulses of curve B, and the frequency of the operation of multivibrator 58 is therefore one-half that of multivibrator 57. During field-retrace or mode-determining intervals, the periodic actuation of multivibrator 58 is interrupted or altered as a function of the code schedule.

Thus, the negative pulses of curves P, H and K are supplied to multivibrator 58. This multivibrator is assumed to be initially in that stable operating condition wherein discharge device 120 is conductive and device 124 is non-conductive, as indicated by waveform Q which appears at anode 125, although as in the case of multivibrator 57 the initial operating condition is immaterial. The first three pulses of curve P trip multivibrator 58 between its two stable operating conditions since they are applied to the control electrodes of both of its tubes to produce a periodic square wave during each field-trace interval, as shown in the first portion of curve Q. In response to the $f_1$ burst of curve C, the pulse of curve K is applied to control electrode 122 of device 120 over the cross-coupling circuit from anode 125, and since that device is already in its non-conductive state (as may be seen from curve Q) the applied negative pulse is not effective. Consequently, waveform Q does not undergo an amplitude excursion at that time. Upon receipt of the $f_3$ signal burst the pulse of curve H is applied to both control electrodes 122 and 123 and consequently trips multivibrator 58 to its other operating condition. The remaining two amplitude excursions of curve Q result from the application of the last two pulses of curve P to multivibrator 58.

Thus, considering only the effect of multivibrators 57 and 58, the signal of curve Q is supplied to coder 12 to serve as a control signal. The amplitude excursions of this signal shift the beam of coder 12 and since such excursions occur randomly during the field-retrace intervals, very effective picture scrambling is realized. That portion of the system which has been described in detail thus far is essentially the same as that disclosed in the aforementioned Druz application, Serial No. 370,174.

In accordance with the present invention, the complexity of this coding process is increased materially, resulting in a system which exhibits appreciably improved secrecy aspects. From an examination of FIGURE 1 it is apparent that the pulses of curves H—L which are applied to the various input circuits of bi-stable multivibrators 57 and 58 are also applied to the various input circuits of bi-stable multivibrators 57′ and 58′ but in a different fashion or order. The pulse of curve H is applied to anode 108′ of multivibrator 57′, the pulse of curve J is applied to control electrodes 122′ and 123′ of multivibrator 58′, the pulse of curve K is supplied to anode 125′ of multivibrator 58′, and the pulse of curve L is applied to control electrodes 104′ and 109′ of multivibrator 57′.

The pulses of curve B and those of curves L and H are consequently supplied to multivibrator 57′ which operates in a fashion similar to that explained in connection with multivibrator 57. Specifically, assuming that multivibrator 57′ is also initially in its first stable operating condition wherein device 105′ is non-conductive and 110′ conductive, successive applied pulses of curve B create the square wave of curve R at anode 106′ which is identical to that of curve M before the arrival of the code bursts of curve C. The first pulse applied to multivibrator 57′ other than those of curve B is initiated by the $f_3$ burst of curve C. Upon the receipt of that burst the pulse of curve H is applied to control electrode 104′ over the cross-coupling network from anode 108′, but since device 105′ is already cut-off (as may be seen from curve R), this applied negative pulse has no effect. Consequently, curve R does not undergo an amplitude change at that instant. The next pulse applied to multivibrator 57′ is caused by the $f_6$ burst which results in the application of the pulse of curve L to both control electrodes 104′ and 109′ and this trips multivibrator 57′ to its other operating condition, as shown by curve R. The last two amplitude excursions of curve R result from the application of the last two pulses of curve B to multivibrator 57′.

The signal developed at anode 106′, namely that of curve R, is applied to differentiating network 113′, 114′ to produce the signal of curve S. This signal is applied to control electrode 112′ of buffer amplifier 116′ which is normally biased beyond cut-off, so that only the positive-polarity differentiated pulses of curve S are translated through the buffer stage, with a normal 180° phase inversion. The signal of curve T therefore appears at anode 117′ of device 116′ and is applied to control electrodes 122′ and 123′ of multivibrator 58′ through condensers 118′ and 119′, respectively, to trigger that multivibrator between its two stable operating conditions.

Thus, the pulses of curves T, J and K are applied to multivibrator 58′. As in the case of multivibrator 58, multivibrator 58′ is initially assumed to be in its operating condition wherein device 124′ is non-conductive and device 120′ is conductive as shown by wave form U which appears at anode 125′ of device 124′. Multivibrator 58′ therefore operates in response to successive applied pulses of curve T to produce the square wave of curve U which is identical to that produced in multivibrator 58 before the occurrence of the code bursts of curve C.

In addition to the pulses of curve T, the pulses of curves J and K are also applied to multivibrator 58′ to effect actuation thereof. In response to the $f_4$ burst which causes the application of the pulse of curve J to the control electrodes 122′ and 123′, multivibrator 58′ is triggered from one stable operating condition to another resulting in an amplitude excursion of curve U at that time. Since multivibrator 58′ is already in its reference operating condition (wherein device 124 is conductive and device 120 non-conductive) the application of the negative pulse of curve K to control electrode 122′ over the cross-coupling network from anode 125′ has no effect. Consequently, curve U does not undergo an amplitude excursion until the receipt of the next pulse of curve T which triggers the multivibrator to its opposite state. The last excursion of curve U is caused by the last pulse of curve T.

A comparison of the output signal developed in multivibrator 58′ (curve U) with the output signal of multivibrator 58 (curve Q) reveals certain dissimilarities during the occurrence of the code bursts of curve C and subsequent thereto which are effected by the different circuit connections from gate circuits 36—39.

The output signal of curve U is applied to delay line 71 wherein it is delayed slightly to form the signal shown in curve X which is in turn supplied to one input circuit of coincidence circuit 46 to serve as a gating signal therefor. The purpose of delay line 71 will be made apparent hereinafter. Meanwhile, the $f_2$ burst of curve C is rectified in unit 22 to form the pulse of curve V which is supplied through transposition mechanism 27 to conductor 35 for application to normally-closed gate circuit 40. This gate circuit also receives line-drive pulses (curve A) and operates under the conjoint effect of the pulse of curve V and the line-drive pulse of curve A which occurs in time coincidence therewith to supply the positive pulse of curve W to coincidence circuit 46. Coincidence circuit 46 is effective to translate pulses or code signal components like the one shown in curve W to conductor 47 for application to blocking oscillator 30 only during certain spaced operating intervals determined by multivibrator 58′. In the particular illustrated embodiment, coincidence circuit 46 only passes the pulse of curve W if the gating signal of curve X happens to be at its uppermost or positive level at that time. For the particular case illustrated, the amplitude characteristic of curve X at the time the positive pulse of curve W appears is such that this pulse is translated to blocking oscillator 30 to reset it to its reference or zero-count condition.

In FIGURE 5, curves B′, M′, N′, P′ and Q′ illustrate the modifying effect of multivibrators 57′ and 58′, delay line 71 and signal-translating circuit 46 of the present invention on the waveforms of curves B, M, N, P and Q respectively. The application of the pulse of curve W to blocking oscillator 30 causes premature actuation thereof and momentarily disrupts its 5:1 count, as indicated by pulse 69 of curve B′ which occurs in time coincidence with the pulse of curve W. Multivibrator 57 now operates in response to the pulses of curve B′ in addition to those of curves L and J. Accordingly, the multivibrator is triggered to its opposite condition by pulse 69 of curve B′ as shown in curve M′ which appears at anode 106 of device 105. Since the next pulse applied to multivibrator 57 is that shown in curve L and is applied to both devices 105 and 110, the multivibrator is again triggered to its opposite condition as shown in curve M′. The last two amplitude excursions of curve M′ are effected by the last two pulses of curve B′.

In a similar manner as explained hereinbefore, the output signal of multivibrator 57, namely curve M′, is differentiated to form the signal of curve N′, and the positive- differentiated pulses are applied with inverted polarity as shown in curve P′ to control electrodes 122 and 123 of devices 120 and 124 respectively of multivibrator 58. This multivibrator now operates in response to the pulses of curve P′ in addition to those of curves H and K. Consequently, multivibrator 58 is triggered to its opposite condition in response to the pulse of curve P′ which occurs in time coincidence with pulse 69 of curve B′ to effect an amplitude excursion of the signal developed at the output of that multivibrator, namely the wave shown in curve Q′. This modified output or control signal shown in curve Q′ is actually the signal which is applied to coder 12 to effect actuation thereof to achieve coding; a comparison of curve Q′ and curve Q reveals that the effect of utilizing a modifying signal (curve X) derived from blocking oscillator 30 to gate in a code or reset signal component to the oscillator has a very definite effect on the operation of the system. As will be made apparent hereinafter, if the code determining elements or switches of the transposition mechanism at the receiver are not correctly adjusted, the receiver unit corresponding to multivibrators 57′ and 58′ does not operate to produce the correct modifying signal for varying the translating condition of coincidence circuit 46 and proper decoding cannot be realized. If the modifying signal is wrong, the control signal developed by multivibrator 58 is also wrong and cannot be corrected until the code-determining switches are adjusted to the precise combination required. As in the previous systems decoding is not achieved unless the code-determining elements are properly adjusted, but clandestine appropriation of the coded telecast by trial and error manipulations of the code-determining elements plus observation of the image appearing on the picture tube is made vastly more difficult in the system of the present invention because a wrong setting results in the development of an incorrect modifying signal in addition to failing to clear up the picture. In practice, it has been determined that the time required for trial-and-error decoding, even by skilled engineers and technicians, is increased to such a great extent as to render any such attempts virtually hopeless.

Another advantage resulting from the utilization of a modifying signal in accordance with the invention is that the number of useable code signal combinations is increased considerably over that permitted in the prior systems. In fact, there is no restriction whatever in the make-up or composition of each of the code combinations or groups; any and all possible combinations may be employed at random without inhibition. To explain, assume for the moment that coincidence circuit 46 and the modifying signal which controls its operation are not present (namely, assume that the system is functioning in essentially the same manner as in the aforementioned Druz application Serial No. 370,174) and that none of the code signal combinations, such as the one shown in curve C, includes bursts that effect the translation of pulses to "resetting" input circuits 42 and 43, i.e., those input circuits that trigger multivibrators 57 and 58 to predetermined and definite operating conditions as distinguished from "common" input circuits 44 and 41 which are utilized to trigger each multivibrator from its instantaneous state or condition, whichever one that may be, to its opposite state. If the operation of a control mechanism (which includes circuits corresponding to 30, 57 and 58 as will be made apparent later) at any one of the receivers now happens to fall out of step due to the effect of noise or some other unwanted signal, it will not regain synchronous operation with the transmitter. This follows since all the pulses in the code combinations are effective to trip the multivibrators (corresponding to 57 and 58) to their opposite states inasmuch as these pulses are supplied to the "common" input circuits, and no pulses are available to trigger them to definite operating conditions which would effectively establish the multivibrators in reference conditions to put them back in step with the transmitter. Consequently, in order to maintain synchronous operation between the transmitter and receivers in prior systems, such as that illustrated in the Druz application, the useable code signal combinations are restricted in that some of the code bursts must be destined for the "resetting" input circuits in order to establish the system at distinct reference conditions occasionally as a precautionary measure to counter the effect of possible noise or other signals.

On the other hand, if a modifying signal and a coincidence circuit corresponding to 46 are used in accordance with the present invention, although the system may still be thrown out of synchronism momentarily due to noise signals or for some other reason, unlike the previous arrangements the present system automatically falls back in step. This obtains since at times circuit 46 either effects the translation of a pulse to the blocking oscillator corresponding to 30 when it should not, namely when a corresponding pulse is not translated at the transmitter, or does not translate a pulse when it should do so, all due to the fact that the modifying signal is out of step or phase at the receiver. However, when this does happen the operation or non-operation of the corresponding blocking oscillator at some time or other effectively places the corresponding multivibrators in the same operating condition or state as multivibrators 57 and 58 at the transmitter, even though all of the pulses in the code combinations are channeled to the "common" input circuits. When this occurs the receiver falls back into step with the transmitter. It is apparent that this feature permits a much wider latitude in the selection of code signal combinations since it is no longer necessary to include pulses within each combination that effect triggering of the multivibrators to reference operating conditions. Consequently, there are no restrictions whatever in the choice or make-up of the code groups. Considerably enhanced secrecy is thus realized.

The effect of gating in a reset signal component to blocking oscillator 30 to form the modified signal of waveform B′ also manifests itself in the operation of multivibrators 57′ and 58′ since those multivibrators are also triggered by the output signal from the blocking oscillator. Modified waveforms R′, S′, T′, U′ and X′ corresponding to R, S, T, U and X respectively have therefore been drawn in FIGURE 5 to illustrate the manner in which these signals are varied. Consequently, the pulses of curve B′ are applied to multivibrator 57′ in addition to those of curves L and H. As may be seen from curve R′, which appears at anode 106′ of device 105′, multivibrator 57′, is actuated by pulse 69 to its opposite condition. This multivibrator is then triggered again by the pulse of curve L which is applied to both devices 105′ and 110′; the last two amplitude excursions of curve R′ are caused by the application of the last two pulses of curve B′ from blocking oscillator 30. The differentiated pulses of curve S′ and the negative pulses of curve T′ are produced as explained before from the pulses of curve R′, and the signal of curve U′ appears at anode 125′ of device 124′ in response to the negative pulses of curve T′ and also the negative pulses of curves J and K. The signal of curve U′ is delayed in delay line 71 to develop the signal of curve X′ which is actually the one supplied to coincidence circuit 46. Inasmuch as the modifying signal developed as multivibrator 58′ is utilized to gate in pulses which may be effective, in turn to alter that modifying signal, delay line 71 is provided to introduce a slight delay between the time at which the modifying signal is developed and the time at which it is used. Thus even if the modifying signal developed in multivibrator 58′ is established at its positive level at the instant a line-drive pulse like the one shown in curve W is applied to coincidence circuit 46, that modifying signal because of the delay introduced by delay line 71 is not altered to its negative level by means of that pulse to render gate 46 ineffective until after the entire pulse has been gated in. In practice, delay line 71 is not essential and is therefore usually omitted; distortion of the translated pulses subsequent to the leading edges is not in any way detrimental, and the system functions perfectly without the delay even though at times the gating signal may itself be modified by a translated triggering pulse immediately subsequent to the occurrence of its leading edge.

By way of summary, the subscription television system illustrated in FIGURE 1 comprises encoding apparatus for varying the operating mode of the system in accordance with a predetermined code schedule. This apparatus includes coder 12, 5:1 blocking oscillator 30, bi-stable multivibrators 57, 58, buffer amplifier 59, gate circuits 36—39, transposition mechanism 27, filter-rectifier units 21—26 and code signal generator 29. The system has a source of code signal components which may be considered the pulses similar to the one illustrated in curve W which appear on conductor 45 each time a signal burst of $f_2$ frequency occurs. Non-linear signal translating means, which is constituted by coincidence circuit 46, has a plurality of translating conditions and couples this source of code signal components to the encoding apparatus. Specifically, it couples the source to blocking oscillator 30. Finally, the subscription television system comprises means, such as bi-stable multivibrator 57′ and 58′, delay line 71 and buffer amplifier 59′ which is coupled to the encoding apparatus, namely to the output of blocking oscillator 30, and to the signal-translating means 46 for varying its translating condition in accordance with a predetermined schedule. In FIGURE 1, as explained, the translating condition of coincidence circuit 46 is varied in accordance with a schedule which is distinctly different from the code schedule represented by the control signal developed in multivibrator 58; however the two code schedules are related to each other by virtue of the common blocking oscillator element 30 from which the two schedules are separately derived.

In order that a subscriber may utilize the coded transmission, it is necessary that the combination of code signal bursts of curve C be made known to such subscriber receivers. To that end, the code bursts are applied to mixer amplifier 13 over conductor 66 to be combined with the composite video signal for transmission to the subscriber receivers. The signal bursts of various frequencies individually occur between successive line-drive pulses superimposed on the vertical or field-retrace blanking pedestals, and in order not to disturb the sweep systems of the subscriber receivers it is desirable that the amplitude level of the blanking pulse be modified to effect an inward modulation by the code signal bursts. To that end, pulses are supplied to synchronizing-signal generator 19 over conductor 28 to produce suitable modulating pulses which, in turn, are supplied to mixer amplifier 13 over conductor 20 to downward modulate the vertical-blanking pulse at the appropriate times.

It is, of course, evident that the utilization of the video carrier wave to convey the encoding information is not essential to the inventive concept and that such information may be distributed in whole or in part in other manners, as for example in the form of auxiliary modulation of the sound carrier wave or of a separate carrier wave or by means of line circuits extending from the transmitter to the subscriber receivers. Alternatively, such encoding information may be developed locally, as for example by scanning suitably perforated code cards distributed only to authorized subscribers.

It may be mentioned at this time that in the particular illustration the code signal bursts are produced during a portion of the vertical-retrace interval so that the interruption of the cyclic operation of oscillator 30 and multivibrators 57 and 58 is effected between field-trace intervals. However, it should be understood that the code signal bursts may be developed and utilized during field-trace intervals, particularly in the event that the encoding information is distributed to authorized receivers in one of the alternative fashions mentioned above.

It is to be emphasized that the code bursts which are used to reset the blocking oscillator, or for that matter the code bursts that are used to actuate multivibrators 57 and 58, may recur at a non-uniform or random rate and at intervals either longer or shorter than a field-trace interval. If the total counting ratio of the counting circuits (5:1 blocking oscillator, multivibrators 57 and 58) is incommensurate with the number of lines in a frame interval, the coded picture gives the appearance or illusion of "walking" or rolling" toward the top or bottom of the image screen no matter how often mode determinations are made by the code bursts. This effect obtains since an encoding arrangement which produces mode changes upon the completion of a sequence of operating steps, when the number of operating steps is not an even submultiple of the number of line intervals per frame, assumes different operating conditions at the beginning of succeeding frames so that mode changes do not occur at corresponding line traces of successive frames. This "walking" effect is achieved in the system described in the present application, under the assumed operating conditions, so long as actuation by the code signal bursts is accomplished less often than once per frame interval, since blocking oscillator 30 and multivibrators 57 and 58 require twenty line-trace intervals to execute one normal complete cycle of operation and this number is not integrally related to the number of line traces in a frame interval (525 under present United States standards).

The receiver of FIGURE 6 which may utilize the subscription telecast from the transmitter of FIGURE 1 includes a radio-frequency amplifier 130 having input terminals connected to an antenna 131 and an output circuit connected to a first detector 133. The first detector is connected through an intermediate-frequency amplifier 134 to a second detector 135 which, in turn, is connected to a viedo amplifier 136. The video amplifier is coupled through an encoding device or decoder 140 to the input terminals of a cathode-ray image-reproducing device 141.

Decoder 140 may be constructed in a similar manner as coder 12 at the transmitter with the exception that it is arranged to operate in a complementary fashion in order effectively to compensate for the variations in the time relation between the video and synchronizing components of the received television signal. Complementary operation of the decoder may be assured by merely reversing the anode connections of the beam-deflection tube as compared with the anode connections employed in the decoder at the transmitter.

Second detector 135 is also coupled to a synchronizing-signal separator 142 which has output circuits connected to a field-sweep system 143 and a line-sweep system 144. These sweep systems are connected to suitable deflection elements associated with reproducing device 141. In order to facilitate the separation of the code signal bursts from the composite television signal, it is desirable to provide circuitry for selecting or gating in only that portion of the composite video signal which contains such bursts. To that end, field-drive pulses are derived from synchronizing-signal separator 142 and supplied to a mono-stable multivibrator 160 which has its output circuit connected to a normally-closed gate circuit 159. The output circuit of video amplifier 136 is also connected via conductor 191 to gate circuit 159 to supply the composite video signal thereto, and the output circuit of this gate is connected to a series of filter-rectifier units 21—26 which correspond identically with the correspondingly numbered units in the transmitter. Line-drive pulses are derived from sweep system 144 and are supplied to a stepdown blocking oscillator 30 which is also identical to the correspondingly numbered oscillator in the transmitter. As indicated by the use of identical reference numerals, the remaining circuitry of FIGURE 6 is identical to the corresponding elements in the transmitter of FIGURE 1.

In the operation of the receiver of FIGURE 6, the coded television signal from the transmitter of FIGURE 1 is intercepted by antenna 131, amplified by radio-frequency amplifier 130 and heterodyned to the selected intermediate frequency of the receiver in first detector 133. The resulting intermediate-frequency signal is amplified in intermediate-frequency amplifier 134 and detected in second detector 135 to produce a composite video signal. This latter signal is amplified in video amplifier 136 and translated through decoder 140 to the input terminals of image-reproducing device 141 to control the intensity of the electron beam in well-known manner.

The synchronizing components are separated in separator 142, the field-synchronizing components being utilized to synchronize sweep system 143 and, hence, the field scansion of image reproducer 141, whereas the line-synchronizing components are utilized to synchronize sweep system 144 and, therefore, the line scansion of device 141. Of course, the sound-modulated carrier wave received along with the video carrier is translated and reproduced in an appropriate audio system which has been omitted from the drawings for the purpose of simplicity.

Decoding at the receiver is accomplished in the identical manner explained hereinbefore in connection with the coding operation at the transmitter; accordingly, the waveforms of FIGURES 4 and 5 are illustrative of receiver as well as transmitter operation, and corresponding letter designations are assigned to the receiver diagram of FIGURE 6 where appropriate. Of course, the transposition mechanism at the receiver must be adjusted to the same setting as that employed at the transmitter, and a suitable charge may be assessed for the switch-setting information.

The receiver of FIGURE 6 has one feature which has no counterpart in the transmitter of FIGURE 1. Specifically, a mixer 161 is connected to the output terminals of multivibrator 160 to derive the gating pulse which is used to gate in the code signal bursts. Mixer 161 is also connected to a blanking circuit 162 which receives line-drive pulses from sweep system 144. Mixer 161 has its output terminals connected to the input terminals of image reproducer 141 and the purpose of this mixer is to supply a blanking signal during field-retrace as well as line-retrace intervals to thereby insure complete blanking of the picture tube during such intervals. This feature is desirable in view of the downward modulation of the code signal bursts as described in connection with the preferred transmitter operation. Additionally, blanking is desirable during line retrace inasmuch as the switching action of decoder 140 is accomplished during selected line-retrace intervals and transient pulses developed at that time might otherwise energize the electron beam of reproducer 141.

In another embodiment of the invention, the second set or series of bi-stable multivibrators 57′ and 58′ may be eliminated along with buffer amplifier 59′ and the same control signal which is developed in multivibrator 58 for actuating coder 12 may itself be used as the modifying or gating signal for application to coincidence circuit 46. FIGURE 7 illustrates the manner in which the transmitter of FIGURE 1 and receiver of FIGURE 6 may be so modified. This arrangement has the obvious advantage of achieving essentially the same result with a considerable decrease in the number of required circuit elements. Briefly, in the FIGURE 7 embodiment code signal components which appear on conductor 45 are applied to gating means or coincidence circuit 46, and if those pulses occur during time intervals when the characteristic of the control signal developed in bi-stable multivibrator 58 is established at a predetermined value, positive for the case illustrated, such pulses are translated to blocking oscillator 30 to establish it in a reference or zero-count operating condition.

As in the case of the embodiment of FIGURE 1, a plurality of code signal components are developed in gate circuit 40 and appear on conductor 45. A control effect is developed at the output of coincidence circuit 46 in response to certain ones only of the code signal components, and the television signal is encoded (either coded or decoded) at least in part in accordance with this control effect. The control effect takes the form of a modifying signal which is derived from the encoder (from bi-stable multivibrator 58 rather than from oscillator 30 as in FIGURE 1) and represents a selecting schedule; certain ones of the code signal components are selected in response to the modifying signal by coincidence circuit 46. In FIGURE 1, since the modifying signal originates at the output of blocking oscillator 30 and is changed considerably by means of multivibrators 57′ and 58′, the selecting schedule of the modifying signal as it is finally applied to coincidence circuit 46 is distinctly different than the schedule of the modifying signal employed in FIGURE 7.

As a further variant of the invention, FIGURE 8 illustrates the manner in which the embodiments of FIGURES 1, 6 and 7 may be further modified to introduce the signal-translating or gating means 46 into one of the input circuits of one of the bi-stable multivibrators used to develop a control signal for coder 12. In this case, gate circuit 40 may be directly connected to blocking oscillator 30 so that each time a signal burst of frequency $f_2$ (for the assumed example) occurs, blocking oscillator 30 is reset to its reference or zero-count condition. Coincidence circuit 46 is now interposed between one of the gate circuits such as gate circuit 37 and the resetting input circuit 42 of bi-stable multivibrator 57 which is connected to control electrode 104 of device 105 over the cross-coupling network from anode 108. The input conductor 44 may remain unaltered.

With this arrangement each time an $f_4$ signal burst occurs a line-drive pulse is gated in and supplied to one input circuit of coincidence circuit 46, but it may or may not be further applied to conductor 42 for application to multivibrator 57 depending on the instantaneous amplitude characteristic of the modifying signal developed at the output of bi-stable multivibrator 58 and fed back to coincidence circuit 46. Moreover, even if the modifying signal does gate in a pulse through coincidence circuit 46 to control electrode 104 of device 105 of multivibrator 57, that pulse may still be ineffective since the multivibrator may already be in its stable operating condition wherein device 105 is cut-off and device 110 conductive.

Still another embodiment of the invention is shown in FIGURE 9. The circuitry illustrated in this figure may be incorporated into the transmitter of FIGURE 1 and the receiver of FIGURE 6 in order that the modifying signal may be derived from some element other than the mechanism which is used to actuate the encoding device. In the previous embodiments discussed, step-down blocking oscillator 30, multivibrators 57 and 58, buffer amplifier 59, gate circuits 36—39, transposition mechanism 27, filter-rectifier units 21—26 and key-signal generator 29 comprise a control mechanism for developing a control signal, at the output terminals of multivibrator 58, having an amplitude characteristic that varies between at least two predetermined values or levels in accordance with a predetermined code schedule. In the FIGURE 1 and FIGURE 6 embodiments a modifying apparatus which includes multivibrators 57′ and 58′ is connected to this control mechanism, specifically to the output terminals of blocking oscillator 30, to derive a signal which is converted to a modifying signal also having an amplitude characteristic that varies between at least two predetermined values in accordance with a control schedule, which is used in turn to translate code signal components to the control mechanism specifically to one input circuit of blocking oscillator 30, only during spaced time intervals when the amplitude characteristic is established at a predetermined value. In the FIGURE 7 and FIGURE 8 embodiments the control signal, which is developed in the control mechanism and is applied to the encoding device, is itself used as a modifying signal for effecting translation of certain ones of the code signal components to the control mechanism.

In the embodiment of FIGURE 9, the modifying signal is derived from the encoding device itself rather than from the control mechanism that effects actuation of the encoding device. Coder 12 and decoder 140 have already been described as preferably comprising beam-deflection tubes having electron beams which are swept back and forth between two segmental anodes. A delay line is connected in circuit between one target anode and the input circuit of mixer amplifier 13 or image-reproducing device 141, depending on whether the encoding device is used for coding or decoding purposes, and the other target anode is coupled directly to mixer 13 or image reproducer 141. A circuit may be coupled to either one of these target anodes to derive the video signal only during one mode of operation, and this intermittent video signal may be filtered to form an irregularly shaped signal having amplitude excursions representing the code schedule of the control signal which is applied to the encoding device to achieve encoding initially. This irregularly shaped signal wave may be applied to a bi-stable multivibrator 48 to vary it somewhat (namely, to eliminate every other amplitude variations), although this is not necessary, before application to coincidence circuit 46 for gating purposes. Gating means or coincidence circuit 46 operates as described hereinbefore and translates pulses to blocking oscillator 30 in response to coincidence of pulses from gate circuit 40 and positive pulse components of the gating signal supplied from multivibrator 48.

In the embodiment of FIGURE 10, the translating means takes the form of a selector rather than a coincidence circuit or gate, so that substantially all of the code signal components appearing on conductor 45 are employed in the code schedule modifying operation. Specifically, a selector 61, which may be a conventional electronic switch comprising an intensity-control grid, a pair of output anodes and a deflection-control signal for switching the code-signal-modulated electron beam between the output anodes, is provided with two output circuits, one being connected over a conductor 62 to stepdown blocking oscillator 30 for reset purposes and the other being connected over a conductor 63 to the resetting input circuit 42 of bi-stable multivibrator 57. Selector 61 has two input circuits, one being connected over conductor 45 to gate circuit 40 and the other being connected to the output terminals of multivibrator 58. With this arrangement, when the amplitude characteristic of the control signal developed in multivibrator 58 is established at one level, selector 61 is established in one operating or translating condition to effect application of pulses from conductor 45 to conductor 62 and thence to blocking oscillator 30. On the other hand, when the amplitude characteristic is established at the other level, selector 61 is tripped to its other operating or translating condition wherein pulses are supplied from conductor 45 to conductor 63 and thence to bi-stable multivibrator 57. In the embodiment of FIGURE 10 substantially all of the code signal components from gate circuit 40 are utilized to modify the code schedules. Of course, it should be noted that inasmuch as conductor 63 is connected to the resetting input circuit of multivibrator 57, some pulses applied thereto from selector 61 may be ineffective inasmuch as device 105 may already be in its non-conductive condition.

The invention, therefore, provides an improved subscription television system wherein a modifying signal is derived from the encoding apparatus and is utilized in turn to vary the operation of that same encoding apparatus thereby to alter the code schedule which would otherwise be imposed on the television signal.

While particular embodiments of the invention have been shown and described, modifications may be made, and it is intended in the appended claims to cover all such modifications as may fall within the true spirit and scope of the invention.

I claim:

1. An encoding arrangement for a subscription television system for encoding a television signal comprising: secrecy apparatus for varying the operating mode of said system in accordance with a predetermined code schedule to encode said television signal; a source of code signal components; translating means coupling said source to said secrecy apparatus for translating at least some of said code signal components to said secrecy apparatus and having a plurality of translating conditions; and means coupled between said secrecy apparatus and said translating means for varying the translating condition of said translating means in accordance with said predetermined code schedule.

2. An encoding arrangement for a subscription television system for encoding a television signal comprising: a secrecy device having a plurality of operating conditions each of which establishes said system in a predetermined operating mode to encode said television signal; a control mechanism coupled to said secrecy device for effecting actuation of said device between its aforesaid operating conditions in accordance with a predetermined code schedule; a source of code signal components representing a predetermined schedule; means coupled to said source and to said control mechanism for translating said code signal components to said control mechanism; and means coupled to said control mechanism and to said translating means for rendering said translating means effective during certain spaced operating intervals and ineffective during other spaced operating intervals as determined by said code schedule.

3. An encoding arrangement for a subscription television system for encoding a television signal comprising: a secrecy device having a plurality of operating conditions each of which establishes said system in a predetermined operating mode to encode said television signal; a control mechanism for developing a control signal having a characteristic that varies between at least two predetermined control conditions in accordance with a predetermined code schedule; means coupled to said control mechanism and to said secrecy device for translating said control signal to said secrecy device to effect actuation thereof between its aforesaid operating conditions in accordance with said code schedule; a source of code signal components representing a predetermined schedule; gating means; and means coupling said control mechanism and said source to said gating means to apply to said control mechanism certain ones only of said code signal components which occur during time intervals when said characteristic is established at a predetermined one of said control conditions.

4. An encoding arrangement for a subscription television system for encoding a television signal comprising: a secrecy device having a plurality of operating conditions each of which establishes said system in a predetermined operating mode to encode said television signal; a control mechanism having a plurality of operating conditions for developing a control signal having a characteristic that varies between at least two predetermined control conditions in accordance with a predetermined code schedule; means coupled to said control mechanism and to said secrecy device for translating said control signal to said secrecy device to effect actuation thereof between its aforesaid operating conditions in accordance with said code schedule; a source of reset signal components representing a predetermined reset schedule; gating means; and means coupling said control mechanism and said source to said gating means to apply to said control mechanism certain ones only of said reset signal components which occur during time intervals when said characteristic is established at a predetermined one of said control conditions to effect actuation of at least a portion of said mechanism to a predetermined reference operating condition.

5. An encoding arrangement for a subscription television system for encoding a television signal comprising: a secrecy device having a plurality of operating conditions each of which establishes said system in a predetermined operating mode to encode said television signal; a control mechanism for developing a control signal having a characteristic that varies between at least two predetermined control conditions in accordance with a predetermined code schedule; means coupled to said control mechanism and to said secrecy device for translating said control signal to said secrecy device to effect actuation thereof between its aforesaid operating conditions in accordance with said predetermined code schedule; a source of code signal components; gating means coupling said source to said control mechanism for translating said code signal components to said control mechanism; and means coupling said control mechanism to said gating means for supplying said control signal to said gating means to effect actuation of said gating means in accordance with said predetermined code schedule to apply to said control mechanism certain ones only of said code signal components which occur during time intervals when said characteristic of said control signal is established at a predetermined one of said control conditions.

6. An encoding arrangement for a subscription television system for encoding a television signal comprising: a secrecy device having a plurality of operating conditions each of which establishes said system in a predetermined operating mode to encode said television signal; a control mechanism coupled to said secrecy device for effecting actuation of said device between its aforesaid operating conditions in accordance with a predetermined code schedule; a plurality of input circuits for said control mechanism; a source of code signal components representing a predetermined schedule; selecting means coupled to said source and to said plurality of input circuits for translating said code signal components to selected ones of said input circuits for application to said control mechanism; and means coupled to said control mechanism and to said selecting means for effecting actuation of said selecting means to supply code signal components to one of said input circuits during certain spaced operating intervals and to another of said input circuits during other spaced operating intervals.

7. An encoding arrangement for a subscription television system for encoding a television signal comprising: a secrecy device having a plurality of operating conditions each of which establishes said system in a predetermined operating mode to encode said television signal; a control mechanism for developing a control signal having a characteristic that varies between at least two predetermined control conditions in accordance with a predetermined code schedule; means coupled to said control mechanism and to said secrecy device for translating said control signal to said secrecy device to effect actuation of said secrecy device between its aforesaid operating conditions; a plurality of input circuits for said control mechanism; a source of code signal components representing a predetermined schedule; selecting means coupled to said source and to said plurality of input circuits for translating said code signal components to selected ones of said input circuits for application to said control mechanism; and means coupled to said control mechanism and to said selecting means for effecting actuation of said selecting means to supply to said control mechanism over one of said input circuits the code signal components which occur during time intervals when said characteristic is established at a predetermined one of said control conditions and over another of said input circuits the code signal components which occur during time intervals when said characteristic is established at the other of said control conditions.

8. A coding arrangement for a subscription television transmitter for coding a television signal comprising: a coding device having a plurality of operating conditions each of which establishes said transmitter in a predetermined operating mode to code said television signal; a control mechanism having a plurality of operating conditions for developing a control signal having a characteristic that varies between at least two predetermined control conditions in accordance with a predetermined code schedule; means coupled to said control mechanism and to said coding device for translating said control signal to said coding device to effect actuation of said coding device between its aforesaid operating conditions in accordance with said code schedule; a source of reset signal components representing a predetermined reset schedule; gating means; and means coupling said control mechanism and said source to said gating means to apply to said control mechanism certain ones only of said reset signal components which occur during time intervals when said characteristic is established at a predetermined one of said control conditions to effect actuation of at least a portion of said mechanism to predetermined reference operating conditions.

9. A decoding arrangement for a subscription television receiver for decoding a television signal comprising: a decoding device having a plurality of operating conditions each of which establishes said receiver in a predetermined operating mode to decode said television signal; a control mechanism having a plurality of operating conditions for developing a control signal having a characteristic that varies between at least two predetermined control conditions in accordance with a predetermined code schedule; means coupled to said control mechanism and to said decoding device for translating said control signal to said decoding device to effect actuation of said decoding device between its aforesaid operating conditions in accordance with said code schedule; a source of reset signal components representing a predetermined reset schedule; gating means; and means coupling said control mechanism and said source to said gating means to apply to said control mechanism certain ones only of said reset signal components which occur during time intervals when said characteristic is established at a predetermined one of said control conditions to effect actuation of at least a portion of said mechanism to a predetermined reference operating condition.

10. An encoding arrangement for a subscription television system for encoding a television signal comprising: a secrecy device having a plurality of discrete operating conditions each of which establishes a unique operating mode in said system to encode said television signal; an actuating mechanism comprising a plurality of cascade-connected non-linear signal-translating stages for actuating said secrecy device between said operating conditions; means coupled to a predetermined one of said stages for controlling the operation of said actuating mechanism in accordance with a predetermined secret code schedule; means coupled to one of said stages subsequent to the stage immediately preceding said predetermined stage for deriving a modifying signal representing a control schedule related to said predetermined code schedule; and means coupled to said modifying-signal-deriving means and to one of said stages for utilizing said modifying signal to change the operation of said actuating mechanism in accordance with said control schedule thereby to alter said predetermined code schedule.

11. A encoding arrangement for a subscription television system for encoding a television signal comprising: a secrecy device having a plurality of discrete operating conditions each of which establishes a unique operating mode in said system to encode said television signal; an actuating mechanism comprising a plurality of cascade-connected non-linear signal-translating stages for actuating said secrecy device between said operating conditions; means coupled to a predetermined one of said stages for controlling the operation of said actuating mechanism in accordance with a predetermined secret code schedule; means coupled to one of said stages subsequent to the stage immediately preceding said predetermined stage for deriving a modifying signal representing a control schedule related to said predetermined code schedule; and means coupled to said modifying-signal-deriving means and to one of said stages other than said subsequent stage for utilizing said modifying signal to change the operation of said actuating mechanism in accordance with said control schedule thereby to alter said predetermined code schedule.

12. An encoding arrangement for a subscription television system for encoding a television signal comprising: a secrecy device having a plurality of discrete operating conditions each of which establishes a unique operating mode in said system to encode said television signal; an actuating mechanism comprising a plurality of cascade-connected non-linear signal-translating stages for actuating said secrecy device between said operating conditions; means coupled to a predetermined one of said stages for controlling the operation of said actuating mechanism in accordance with a predetermined secret code schedule; means coupled to one of said stages subsequent to the stage immediately preceding said predetermined stage for deriving a modifying signal representing a control schedule related to said predetermined code schedule; and means coupled to said modifying-signal-deriving means and to one of said stages preceding said subsequent stage for utilizing said modifying signal to change the operation of said actuating mechanism in accordance with said control schedule thereby to alter said predetermined code schedule.

13. An encoding arrangement for a subscription television system for encoding a television signal comprising: a secrecy device having a plurality of operating conditions each of which establishes said system in a distinctly different operating mode to encode said television signal; an actuating mechanism for controlling the operation of said secrecy device; means coupled to said actuating mechanism for effecting operation thereof in accordance with predetermined secret code information; means coupled to said actuating mechanism for deriving a modifying signal representing control information related to said code information; and means coupled to said modifying-signal-deriving means for utilizing only a portion of said control information to change the operation of said actuating mechanism thereby to alter the code schedule which would otherwise be imposed on said television signal.

14. An encoding arrangement for a secrecy communication system for encoding an intelligence signal comprising: secrecy apparatus, including a plurality of cascade-connected, multi-condition counting devices each of which has a reference operating condition, for varying the operating mode of said system in accordance with a predetermined code schedule to encode said intelligence signal; means for deriving a modifying signal from the last one of said counting devices; and means coupled to said modifying-signal-deriving means and to said secrecy apparatus for utilizing said modifying signal to modify the operation of the first of said counting devices and for resetting less than all of said counting devices to their respective reference operating conditions.

15. An encoding arrangement for a secrecy communication system for encoding an intelligence signal comprising: secrecy apparatus, including a plurality of cascade-connected, multi-condition counting devices each of which has a reference operating condition, for varying the operating mode of said system in accordance with a predetermined code schedule to encode said intelligence signal; means for deriving a modifying signal from at least one of said counting devices; means coupled to said modifying-signal-deriving means and to said secrecy apparatus for utilizing said modifying signal to reset at least one, but less than all, of said counting devices to their respective reference operating conditions.

16. An encoding arrangement for a secrecy communication system for encoding an intelligence signal comprising: secrecy apparatus, including a chain of a plurality of cascade-connected, multi-condition counting devices collectively having a sequence of operating steps, for varying the operating mode of said system to encode said intelligence signal; means for cyclically actuating said counting chain through its sequence of operating steps; means for disrupting the cyclic operation of at least one of said counting devices; means for deriving a modifying signal from said secrecy apparatus; and means coupled to said modifying-signal-deriving means and to said secrecy apparatus for utilizing said modifying signal to disrupt the cyclic operation of at least one other one of said counting devices.

17. An encoding arrangement for a subscription television system for encoding a television signal comprising: secrecy apparatus for varying the operating mode of said system in accordance with a predetermined code schedule to encode said television signal; a source of code signal components; translating means for translating at least some of said code signal components coupling said source to said secrecy apparatus and having a plurality of translating conditions; and means coupled between said secrecy apparatus and said translating means for varying the translating condition of said translating means in accordance with said predetermined code sechdule.

References Cited in the file of this patent

UNITED STATES PATENTS

| | | |
|---|---|---|
| 2,414,101 | Hogan | Jan. 14, 1947 |
| 2,472,774 | Mayle | June 7, 1949 |
| 2,517,587 | Mohr | Aug. 8, 1950 |
| 2,547,598 | Roschke | Apr. 3, 1951 |
| 2,656,407 | Herrick et al. | Oct. 20, 1953 |
| 2,757,226 | Zworykin | July 31, 1956 |
| 2,823,252 | Bridges | Feb. 11, 1958 |